Figure 1:
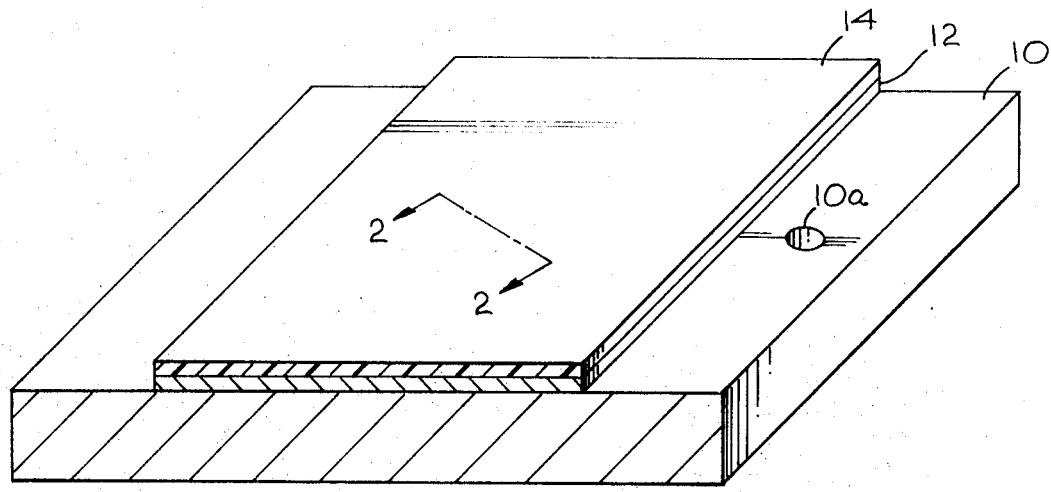

United States Patent

Older et al.

[15] 3,649,274
[45] Mar. 14, 1972

[54] COAXIAL CIRCUIT CONSTRUCTION METHOD

[72] Inventors: Robert B. Older, Woodland Hills; Charles W. Smith, Canoga Park, both of Calif.

[73] Assignee: The Bunker-Ramo Corporation, Oak Brook, Ill.

[22] Filed: Sept. 18, 1969

[21] Appl. No.: 858,923

[52] U.S. Cl. ..............................96/36.2, 29/625, 174/68.5
[51] Int. Cl. ...........................................................G03c 5/00
[58] Field of Search ......................96/36.2; 29/625; 174/68.5

[56] References Cited

UNITED STATES PATENTS

| | | |
|---|---|---|
| 3,391,454 | 7/1968 | Reimann et al. ......................174/68.5 |
| 3,366,519 | 1/1968 | Pritchard et al. .......................96/36.2 |
| 2,692,190 | 10/1954 | Pritkin ....................................96/36.2 |
| 3,042,591 | 7/1962 | Cado ......................................29/625 |

*Primary Examiner*—J. Travis Brown
*Assistant Examiner*—John Winkelman
*Attorney*—Frederick M. Arbuckle

[57] ABSTRACT

A coaxial circuit construction method in which a coaxial structure is fabricated by successively applying layers of metal and photopolymer material, the photopolymer layers being photographically processed to form patterns which provide the required insulation, and the metal layers being formed by up-plating and precision grinding.

4 Claims, 20 Drawing Figures

PATENTED MAR 14 1972 3,649,274

SHEET 1 OF 5

INVENTORS
CHARLES W. SMITH
ROBERT B. OLDER
BY
Nathan Cass
ATTORNEY

INVENTORS
CHARLES W. SMITH
ROBERT B. OLDER
BY Nathan Gass
ATTORNEY

INVENTORS
CHARLES W. SMITH
ROBERT B. OLDER
BY
Nathan Cass
ATTORNEY

COAXIAL CIRCUIT CONSTRUCTION METHOD

This invention relates to a coaxial circuit construction and method of making.

In recent years, considerable attention has been directed to improved coaxial circuit constructions and techniques for fabrication thereof as indicated, for example, by the constructions and techniques disclosed in U.S. Pats. Nos. 3,351,702; 3,351,816; 3,351,953; and 3,391,454.

In accordance with the objects and purposes of the present invention, a coaxial circuit construction and method of fabrication are disclosed for providing an up-plated coaxial structure in which the required insulation between the coaxial conductors is provided by a plurality of selectively processed layers of a photopolymer material which is also able to serve as a satisfactory electrical insulative material between the conductors. Such an approach results in an improved construction which can be fabricated in a remarkably simple and inexpensive manner as compared to presently known techniques.

The specific nature of the invention as well as other objects, advantages and uses thereof will become apparent from the following description of an exemplary embodiment taken in conjunction with the accompanying drawings in which:

FIGS. 1–20 are fragmentary pictorial and cross-sectional views illustrating various stages of construction in preparing coaxial circuitry in accordance with the invention. FIGS. 2, 4, 6, 8, 10, 12 and 13, 15 and 16, and 18 and 19 are cross-sectional views taken along the correspondingly numbered sectioning lines indicated in the respective pictorial views of FIGS. 1, 3, 5, 7, 9, 11, 14, and 17.

Like characters refer to like elements throughout the figures of the drawings. For greater clarity, the thicknesses of various layers in the drawings have been exaggerated. Also, for additional clarity, FIGS. 1–19 of the drawings are restricted to illustrating the fabrication of only a single coaxial conductor. However, it is to be understood that a plurality of such coaxial conductors having desired predetermined patterns are ordinarily batch fabricated at the same time. Accordingly, when considering FIGS. 1–19 with the description herein provided, it should be recognized that like operations may also be simultaneously performed for other coaxial conductors.

Figure 2:
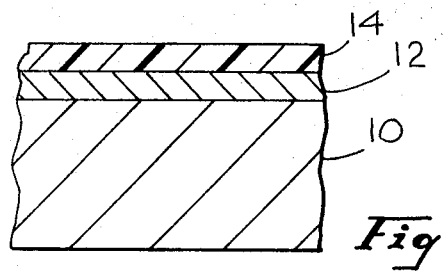

Referring to FIGS. 1 and 2, illustrated therein is a stainless steel carrier block 10 which serves as a temporary carrier throughout the fabrication process. The block 10 is of sufficient size to include the desired coaxial conductor circuit pattern and is also provided with registration holes, such as illustrated by the hole 10a. A metal base layer or foil 12, which may, for example, be copper or nickel, is bonded to the carrier block 10 preferably using jewelers' wax so that the completed coaxial circuit structure can easily be removed to permit the carrier block 10 to be reused.

As illustrated in FIGS. 1 and 2, a first photopolymer layer 14 is provided over the metal base layer 12, such as by being rolled on or solvent-bonded. It is important that the photopolymer layer 14, as well as the other photopolymer layers provided later on in the fabrication process, have the dual capability of being able to be selectively photographically processed as well as being able to serve as a satisfactory electrical insulative material for the resultant coaxial circuitry. An example of a suitable photopolymer is a polyester copolymer available from DuPont under the trademark "Riston," and which may be rolled on over the metal base layer 12 in FIGS. 1 and 2 to provide the photopolymer layer 14. Another example of a suitable photopolymer is "Templex," also a trademarked product of DuPont.

Figure 3:
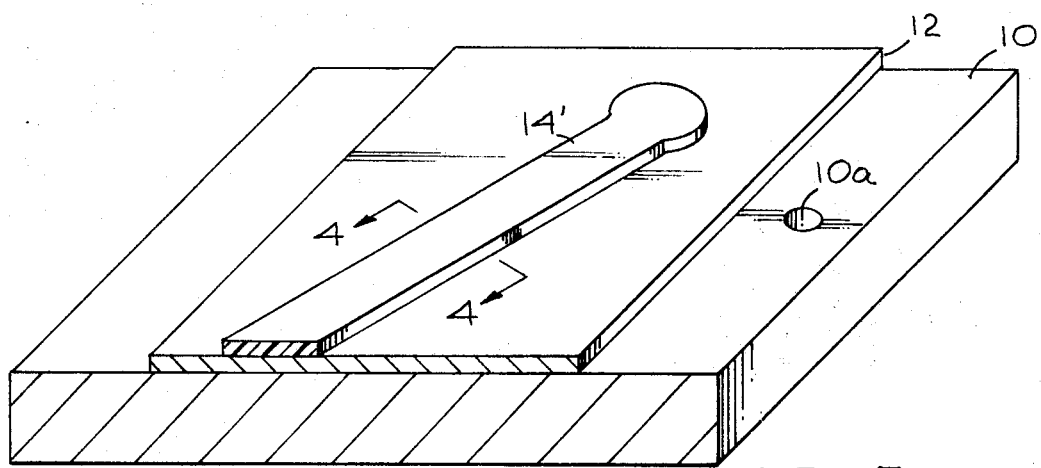
Figure 4:
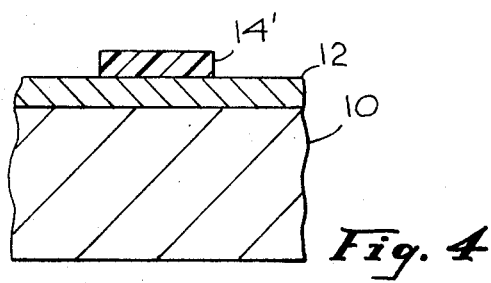

The next step in the fabrication process is to selectively process the photopolymer layer 14 to provide a desired photopolymer layer pattern on the baseplate 12, such as typically illustrated by the single elongated photopolymer strip 14' shown in FIGS. 3 and 4. This is typically accomplished by selectively exposing to light the surface of the photopolymer layer 14 in those areas which are to be retained, and then removing the unexposed areas of the photopolymer layer 14 by photographic developing.

Figure 5:
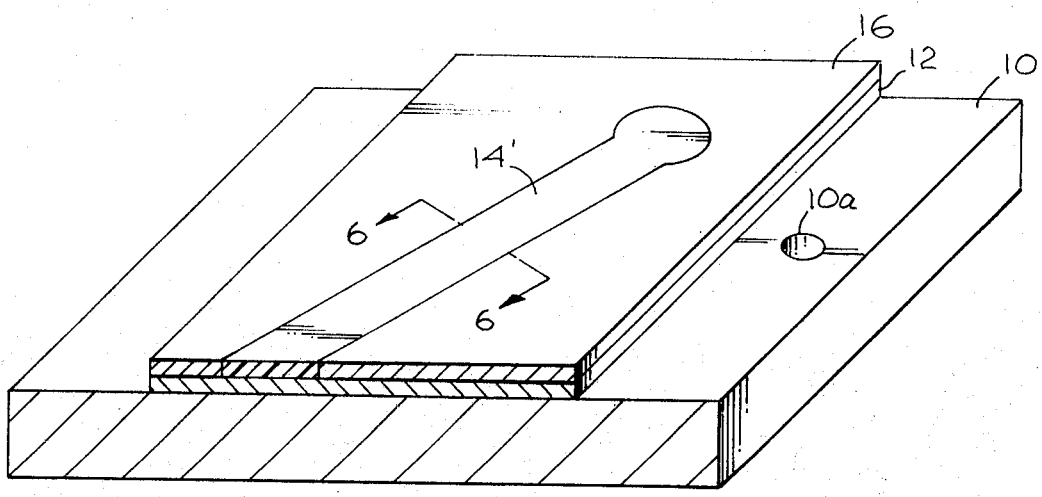
Figure 6:
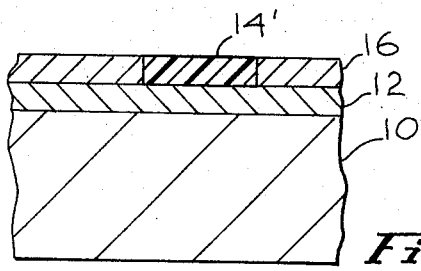

With reference now to FIGS. 5 and 6, well-known plating techniques are employed to up-plate the metal base layer 12 of the structure of FIGS. 3 and 4 to a level to or above the surface of the photopolymer layer pattern 14'. Precision grinding techniques employing, for example, a planetary grinder or precision surface sander, are then used to make the resulting up-plated layer 16 flush with the surface of the photopolymer layer pattern 14', as illustrated in FIGS. 5 and 6.

Figure 7:
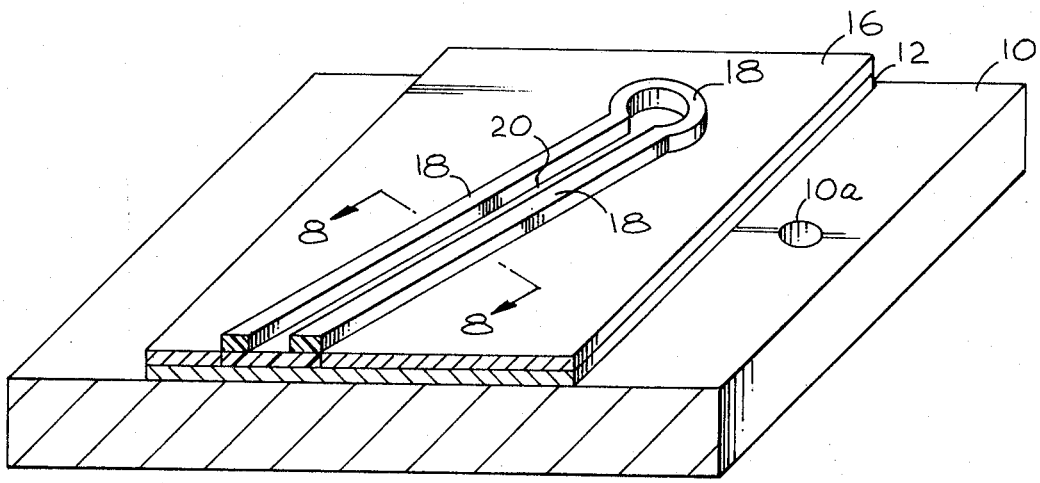
Figure 8:
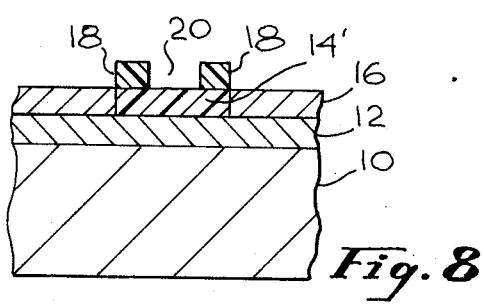

Next, a second layer of photopolymer material is provided on the resulting flush surface of the structure of FIGS. 5 and 6. As illustrated in FIGS. 7 and 8, this second photopolymer layer is selectively exposed and developed to form a second photopolymer layer pattern 18 around the peripheral edges of the first photopolymer layer pattern 14' so as to form a recess 20 for receiving the metal material which is to constitute the inner coaxial conductor of the completed coaxial structure. This inner coaxial conductor is formed during the next step, in which up-plating and precision grinding are again employed to provide metal layers 22 and 24 in FIGS. 9 and 10 which are flush with the surface of the second photopolymer layer pattern 18. The flush, electrically insulated metal layer 22 within the cavity 20 constitutes the inner coaxial conductor of the completed structure.

Figure 9:
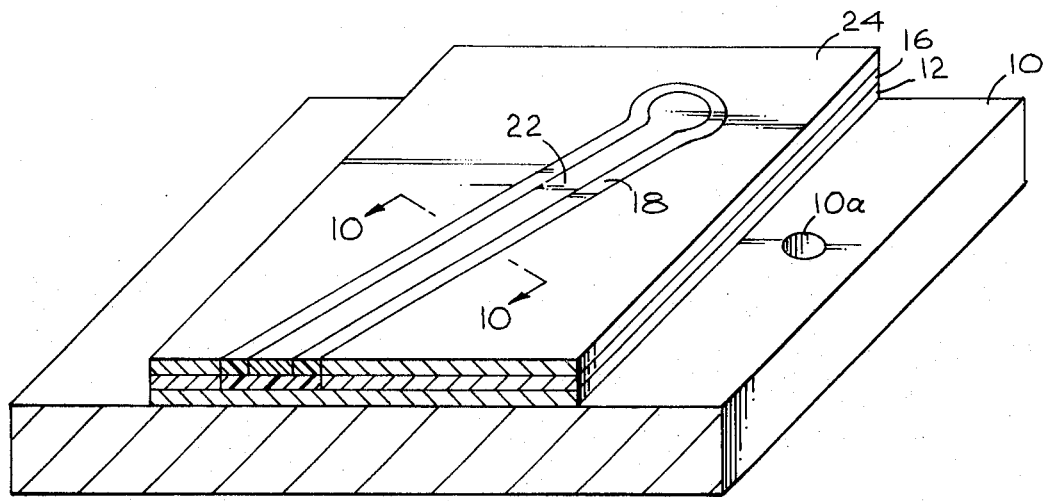
Figure 10:
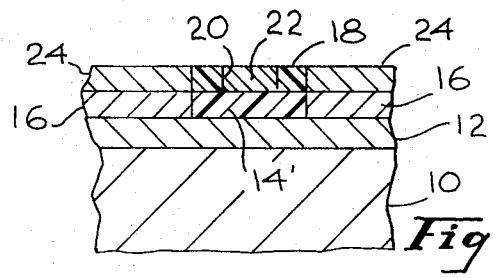
Figure 11:
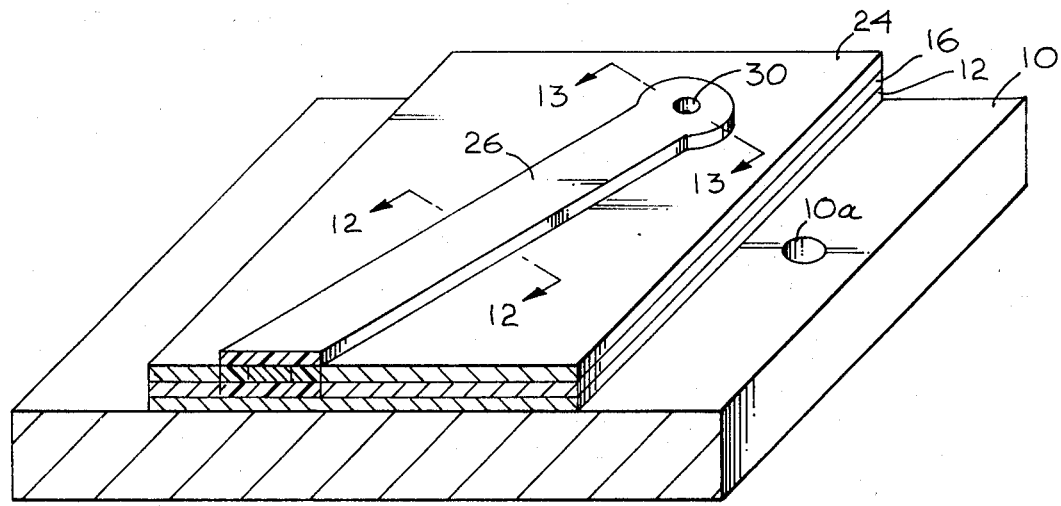
Figures 12, 13:
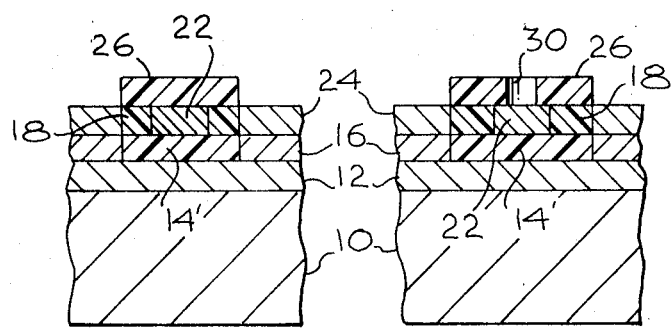
Figure 14:
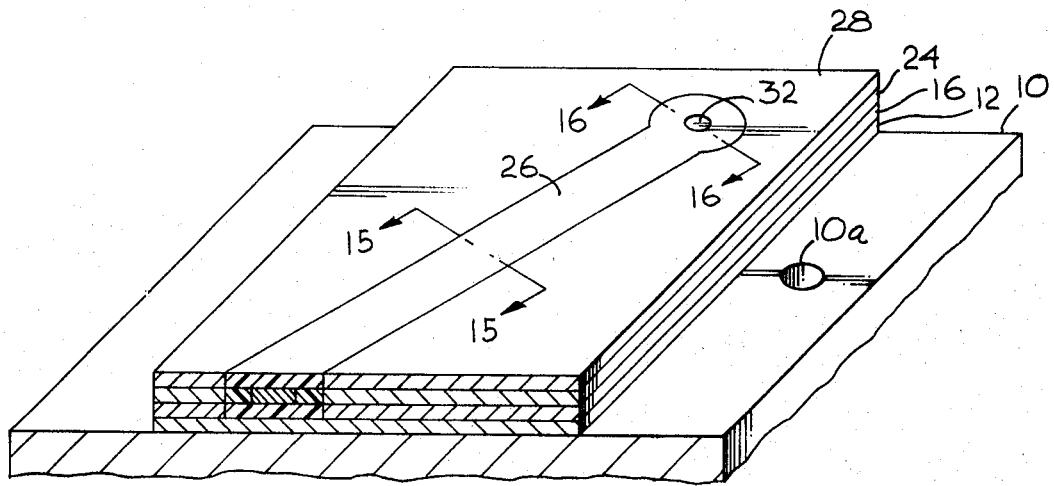
Figures 15, 16:
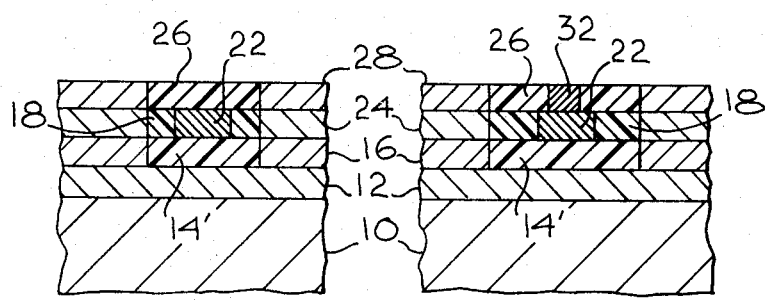

The next step in the fabrication process is to provide a third photopolymer layer on the resulting flush surface of the structure of FIGS. 9 and 10. As illustrated in FIGS. 11–13, this third photopolymer layer is selectively processed to form a third photopolymer layer pattern 26 over the first and second photopolymer layer patterns 14' and 18 so that photopolymer material completely encloses the metal layer 22 constituting the inner coaxial conductor, except for the provision of an opening 30 at one end for feedthrough purposes. As illustrated in FIGS. 14–16, up-plating and precision grinding are then once again employed to provide metal layers 28 and 32 flush with the surface of the third photopolymer layer pattern 26, the metal layer 32 serving to provide electrical feedthrough to the inner coaxial conductor 22.

Figure 17:
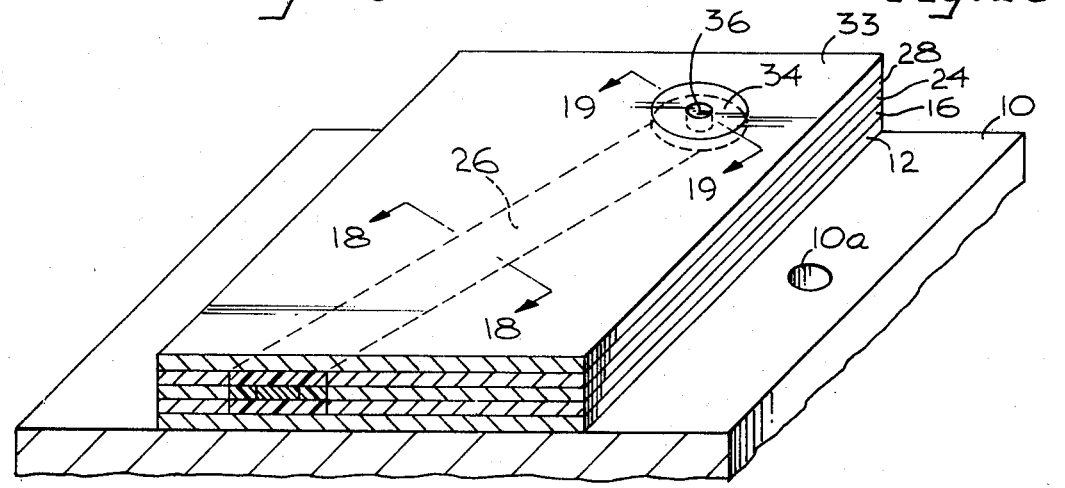
Figures 18, 19:
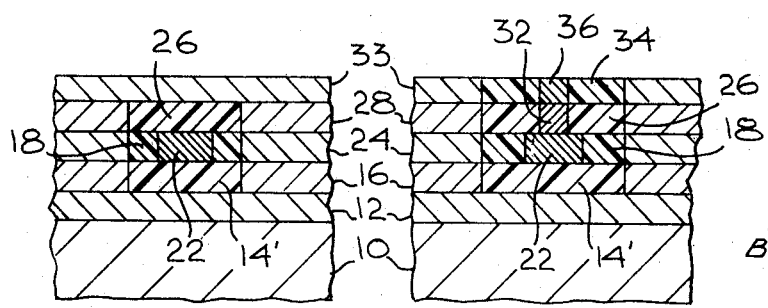

A fourth layer of photopolymer material is next provided on the resulting flush surface of the structure of FIGS. 14–16. As illustrated in FIGS. 17–19, this fourth photopolymer layer is processed to form a fourth photopolymer layer pattern 34 forming an insulative ring around the feedthrough metal layer 32, following which up-plating and precision grinding are again employed to provide metal layers 33 and 36 flush with the fourth photopolymer layer pattern 34. It will thus be understood that complete conductive encirclement of the inner coaxial conductor 22 will have been provided, except for the relatively small photopolymer area provided by the fourth photopolymer layer pattern 34 insulating the metal feedthrough layer 36.

The coaxial structure of FIGS. 17–19 may be removed from the carrier plate 10 by appropriate heating. Such a planar coaxial structure containing a plurality of coaxial conductors fabricated as illustrated in FIGS. 1–19 could then be suitably interconnected to electrical components and/or stacked with like or other planar structures in various ways known to the art. If feedthrough connections are desired on both sides, such may be provided by initially providing insulated through-terminals in the base metal layer 12 flush with the surfaces thereof. The first photopolymer pattern would then be formed so as to provide a small feedthrough opening over each terminal, each such opening being filled with metal during the first up-plating operation so as to provide the desired feedthroughs.

Figure 20:
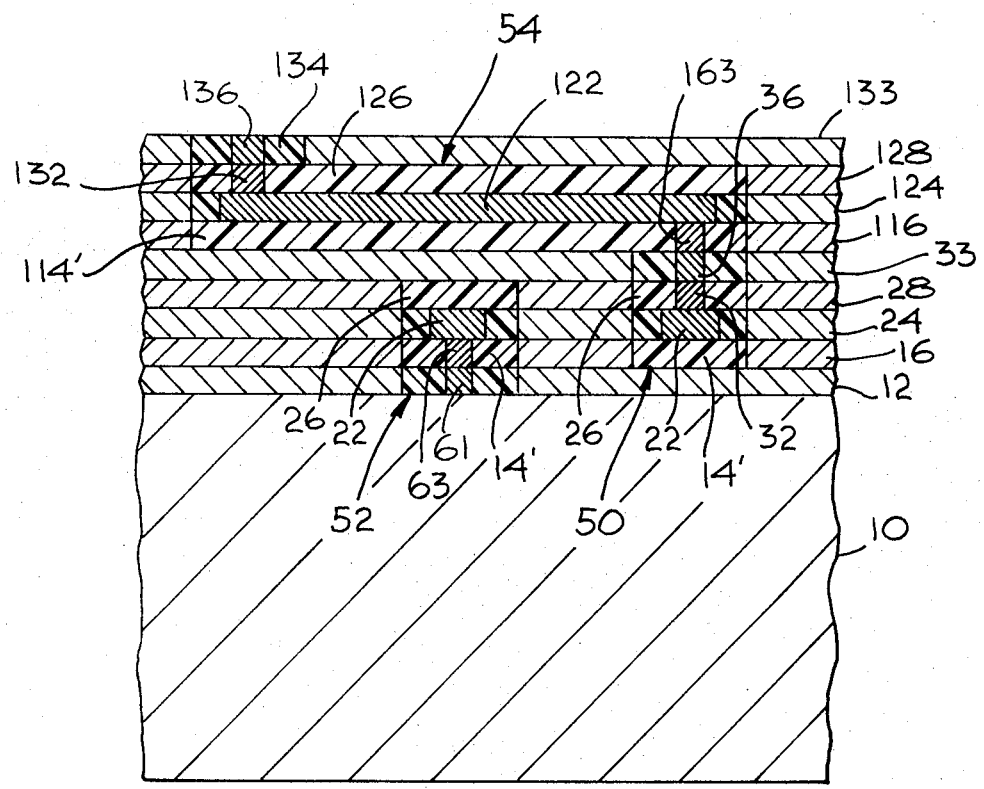

Although the coaxial structure illustrated in FIGS. 17–19 could be removed from the carrier plate 10 and used as a single planar coaxial structure or stacked with other planar structures, as pointed out above, it is to be noted that additional metal and photopolymer layers could be applied in accordance with the invention to provide a three-dimensional structure having a plurality of electrically interconnected levels of coaxial conductors, as illustrated in FIG. 20.

With reference to FIG. 20, a two-level three-dimensional coaxial structure is illustrated having three coaxial conductors 50, 52 and 54. The coaxial conductors 50 and 52 are on the lower level and parallel to each other, and the coaxial conductor 54 is on the upper level and perpendicular to the coaxial conductors 50 and 52. For ready comparison and understanding, upper level elements are designated with numerals 100 greater than those used for respectively corresponding lower level elements. Also, it is to be noted that the top layer 33 of the lower level is the base layer of the upper level.

FIG. 20 further illustrates how a feedthrough connection may typically be provided to the coaxial conductor 52 from the bottom surface of the base layer 12. This is accomplished by the provision of an insulated terminal 61 in the base layer 12 which is electrically connected to the inner coaxial conductor 22 via a metal layer 63 formed during the first up-plating operation in an appropriately located opening provided in the first photopolymer layer pattern 14'. FIG. 20 additionally illustrates how the inner coaxial conductor 22 of the coaxial conductor 50 may be electrically connected, via feedthroughs 32, 36, and 163, to the inner coaxial conductor 122 of the coaxial conductor 54, and how the inner coaxial conductor 122 of the coaxial conductor 54 is in turn fed to the upper surface of the structure of FIG. 20 via feedthroughs 132 and 136.

It is to be understood that the specific forms of the invention described herein are only exemplary, and that the invention is subject to a wide variety of possible modifications and variations in fabrication, construction and use without departing from the scope of the invention as defined by the appended claims.

We claim

1. In a method of fabricating a shielded electrical circuit conductor, the steps of:
   forming a first photopolymer layer of electrically insulative material on a first conductive layer serving as a base layer,
   photographically processing the first photopolymer layer so as to form a first photopolymer layer pattern on said first conductive layer corresponding to a desired path for said conductor,
   plating a second conductive layer on said base layer followed by precision grinding thereof to provide an outer surface flush with the outer surface of the first photopolymer pattern,
   forming a second photopolymer layer on the resulting flush surface formed by the flush outer surfaces of the first photopolymer layer and second conductive layer,
   photographically processing the second photopolymer layer to form a second photopolymer layer pattern aligned with said first photopolymer layer pattern so as to provide an electrically isolated recess for receiving the conductive material which is to constitute said conductor,
   plating a third conductive layer on the flush second conductive layer and first photopolymer layer followed by precision grinding thereof to provide an outer surface flush with the outer surface of the second photopolymer layer, the third conductive layer thus formed within said recess constituting said conductor,
   forming a third photopolymer layer on the resulting flush surface formed by the flush outer surfaces of the second photopolymer layer and third conductive layer,
   photographically processing the third photopolymer layer so as to form a third photopolymer layer pattern aligned with the first and second photopolymer layer patterns in a manner which results in the conductor being surrounded by photopolymer material,
   plating a fourth conductive layer on the second photopolymer and conductive layers followed by precision grinding thereof to provide an outer surface flush with the outer surface of the third photopolymer layer, and
   plating a fifth conductive layer on the resulting flush surface formed by the flush outer surfaces of the third photopolymer layer and fourth conductive layer so as to thereby encircle the conductor with conductive material.

2. The invention in accordance with claim 1,
   wherein the photographic processing of the third photopolymer layer is such that the resulting third photopolymer layer pattern has a feedthrough hole provided therein extending to and exposing a portion of said conductor,
   wherein said feedthrough hole is filled with conductive material when the fourth conductive layer is plated,
   wherein prior to the plating of the fifth conductive layer a fourth photopolymer layer is formed on the resulting flush surface formed by the outer surfaces of the third photopolymer layer and fourth conductive layer, said fourth photopolymer layer being photographically processed to form a fourth photopolymer layer pattern having an opening communicating with the opening in the third photopolymer layer pattern, and
   wherein the opening in the fourth photopolymer layer pattern is plated with conductive material when the fifth conductive layer is plated so as to thereby provide an insulated feedthrough electrical connection from the conductor to the outer surface of the fifth conductive layer.

3. The invention in accordance with claim 1,
   wherein the steps recited are repeated using fifth conductive layer as a base layer so as to thereby form a three-dimensional structure having two levels with a conductor being formed in each level.

4. The invention in accordance with claim 3,
   wherein said method includes photographically processing said photopolymer layers so as to form an insulated electrical connection between the conductor on one level and the conductor on the other level.

* * * * *